Jan. 1, 1952  C. M. HOBSON, JR  2,580,546

JACKETED GASKET

Filed July 2, 1947

Chas. M. Hobson Jr. INVENTOR.

BY

Patented Jan. 1, 1952

2,580,546

UNITED STATES PATENT OFFICE 2,580,546

JACKETED GASKET

Charles M. Hobson, Jr., Wenonah, N. J., assignor to United States Gasket Company, Camden, N. J., a corporation of New Jersey Application July 2, 1947, Serial No. 758,673

7 Claims. (Cl. 288—33)

This invention relates to jacketed gaskets. More specifically the invention relates to gaskets provided with an outer layer or covering of plastic material which is stable at high temperatures and is chemically resistant to acids and other corrosive substances.

Figure 1:
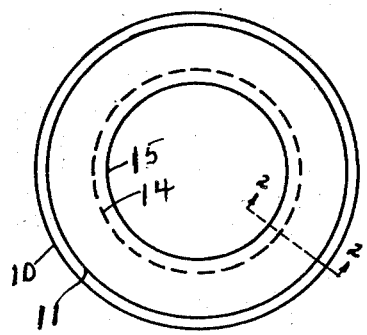
Figure 2:
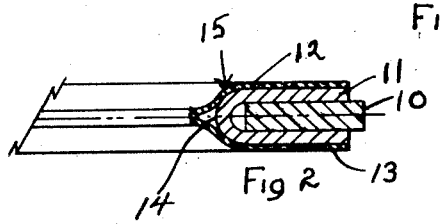
Figure 3:
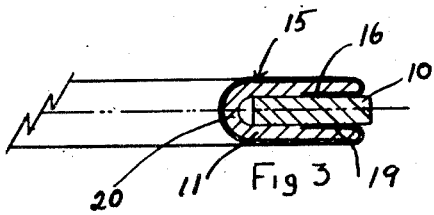

Further details and advantages of the invention will be apparent from the following specification and drawings, wherein:

Figure 1 is a plan view of a gasket provided with an outer covering or jacket of plastic material, Figure 2 is a section taken on lines 2—2 of Figure 1, Figure 3 is a cross-sectional view of another modified form of a jacket gasket construction, and Figures 4 to 10 inclusive illustrate additional cross-sectional views of other modifications of jacketed gasket constructions.

Referring to Figures 1 and 2, the gasket assembly is constructed of an inner gasket ring 10 made of any suitable resilient or compressible material and having any suitable construction. The ring 10, for example, may be made of hard compressed asbestos which is covered with an outer sheath 11 of woven asbestos cloth. This composite gasket ring is provided with an outer substantially U-shaped jacket 15 of plastic material which embraces the inner periphery 14 of the gasket ring, as shown in Figure 2, as well as the flat upper face 12 and lower face 13 of the gasket ring, so as to provide a continuous plastic surface on inner periphery and faces of the gasket assembly as shown in Figure 2.

The jacket is preferably made of polytetrafluorethylene polymer which is manufactured as described in Ind. and Eng. Chemistry, vol. 38, page 870, September 1946, and is sold by E. I. du Pont de Nemours & Co. under the tradename "Teflon." This material is characterized by its chemical inertness which is characteristic from extremely low temperatures up to 572° F. Through this wide temperature range it resists the attack of corrosive reagents and dissolution by solvents. No substance has been found which will dissolve "Teflon" and only molten sodium, and fluorine at elevated pressure chemically changes it. The action of several hundred solvents on "Teflon" have been investigated including halogenated hydrocarbons, chlorusulfonic acid, acetyl chloride, boron trifluoride, high boiling point solvents at their boiling point, ketones, esters, etc., boiling nitric acid, aqua regia, and sodium hydroxide. No reaction has been noted with any of these, nor with chlorine, bromine or iodine. At atmospheric pressure it resists the action of fluorine except for a bleaching effect, which at super atmospheres a reaction is apparent. Chemically, even with the two exceptions noted, it is superior to any other known gasket material.

Moulded "Teflon" is a tough waxy solid, white to gray in color, highly resistant to abrasion, and while it has an appreciably lower tensile strength at 572° F., it can be held at elevated temperatures over long periods of time without change. At 482° F. the decrease in tensile strength is negligible. Similar to most plastics it is subject to cold flow which is much more pronounced as the ambient temperature is increased. This inherent creep and lack of resistance to compression is much more noticeable in thick than in thin sections. Referring again to its plastic deformation, "Teflon" has been drawn 300% to 400% before rupture which usually occurs between 2500 and 4500 p. s. i. of original cross-section.

As a gasket material, the chemical inertness of "Teflon" leaves nothing to be desired. Physically, however, while it is tough, has satisfactory tensile strength, and unique friction and abrasive qualities it lacks the resilience demanded in an otherwise perfect gasket material.

The importance of resiliency to gasket design can best be illustrated by an analysis of the mechanical action of a gasket in service. To seal two mating surfaces, it is obvious that they must be drawn together with a force to prevent the seepage of the confined medium between them. The magnitude of this force varies with operating or service conditions, but to maintain a seal a minimum force must be maintained. It follows, therefore, that if a compressive force between two surfaces such as a gasket to flange is required to seal a joint, the gasket must exert an equal and opposite force to that which is tending to compress it. The ability of a material to allow itself to be compressed and upon release of the compressive forces assumes its original dimensions is resiliency. The ideally resilient material would be one that compresses and recovers in conformance to Hooke's Law. Such a material when compressed within its elastic limit will maintain a reacting force against the mating surfaces to seal the confined medium.

"Teflon" can be compressed, and initially resists the forces compressing it, but within a short time after deformation only in a negligible magnitude does it tend to assume its original dimensions. Consequently, after being compressed the reaction forces between the gasket and flange are often insufficient to maintain a seal. This characteristic of "Teflon" is common to most plastics and one from which they derive their family name.

Having available such a gasket material with unique chemical inertness and all the desirable physical qualities except resilience, the present invention provides the solution to the problem of providing means for extraneously imparting mechanical resilience to "Teflon" to make available for industrial purposes a chemically inert gasket particularly suited to highly corrosive conditions and for service where control of product purity is of utmost importance.

The present invention thus resides essentially in providing a protective envelope or jacket made of "Teflon" or other plastic and chemically inert material which surrounds a gasket made of any suitable material and having any desired construction. The jacket serves to protect the gasket against the action of any acids, gases or other corrosive substances that may be present in any pipe line or system in which the gasket assembly may be used.

Outstanding among the many applications of "Teflon" jacketed gaskets is their use on glass-lined steel equipment. It is customary on such installations to use relatively thick gaskets of a material that will not stick nor be harmful to the glass or require excessive bolting to maintain a seal. Various constructions can be used, the most generally satisfactory being shown in cross-section in Figure 2. This gasket in ring form, say up to 20" O. D., can be used for round openings or for oval openings. Referring to Figure 2, the internal compression ring 10 is compressible since, as previously explained, it is made of compressed asbestos covered with soft woven asbestos cloth which in turn is jacketed with a "Teflon" envelope. The "Teflon" being of a thin section preferably about 0.1 cm. or less is in itself only slightly subject to plastic deformation, the woven asbestos gives the gasket surface-softness, while the inner compression ring contributes internal resistance of the gasket to compression, forcing the "Teflon" tightly into any irregularities of waviness that might be found in the glazed surfaces of this type of equipment. Not only is the surface softness of these gaskets unharmful to the sealing surfaces, but the unique anti-adhesive properties of "Teflon" further prevents their damage due to the necessity of abusive measures in the removal or replacement of gaskets.

Figure 3 indicates a similar type of construction as Figure 2 except that here the "Teflon" 15 is wrapped circumferentially around the resilient asbestos filler 11, having the free margins 16 thereof folded inwardly at the outer periphery so as to be retained between the inner ring 10 and outer sheath 11. This type of construction is used on large diameter rings for agitator and kettle heads and irregular shapes too large to be made as indicated in Figure 2.

Figure 4:
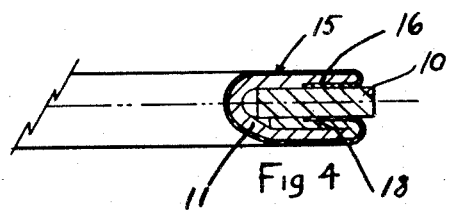
Figure 5:
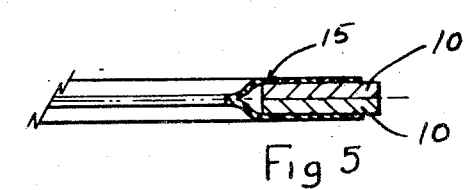
Figure 6:
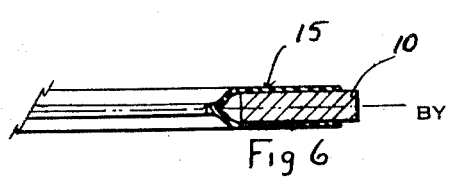

Figure 4 shows a construction similar to Figure 3 which is found to be advantageous on equipment which has an abrupt hump in the flange to be sealed, or radius, just outside of the inside diameter. By folding the free margins of asbestos layer 11 back on itself at 18 greater thickness is provided at this area to give better sealing action. The "Teflon" jacket 15 is wrapped around the gasket and the free margins 16 thereof are folded back and tucked in between the ring 10 and asbestos layer 11. Added softness is given the overlapped area 18 to allow more of the gasket to flow into the remaining surface before being backed up by the internal compression ring.

Where mating surfaces are flat and parallel, it is not usually necessary to use a gasket as thick as discussed above. In such cases, a variety of gasket material fillers have been found to be suitable. Up to thicknesses of 1/8" the compression ring can be safely omitted as shown in Figure 5, utilizing only two superimposed layers 10 of compressed asbestos. Figure 6 illustrates a homogeneous gasket material 10 such as rubber, Neoprene, or ebonite provided with an outer jacket 15 of "Teflon." Most of these find service in porcelain or ceramic pipe lines.

Figure 7:
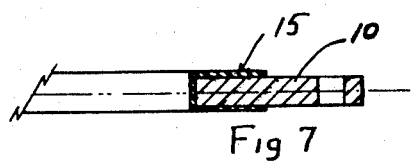

Glass pipe presents a somewhat more difficult problem due to the limited wall thickness and the beaded contour of the pipe ends. Figure 7 illustrates the application of a jacket 15 of "Teflon" with a flexible rubber insert 10 for normal temperatures, or ebonite for high and sustained temperatures. While the protective "Teflon" envelope is of ring type construction, the filler is cut to conform to gasket standards for glass pipe and to suit their bolting.

Figure 8:
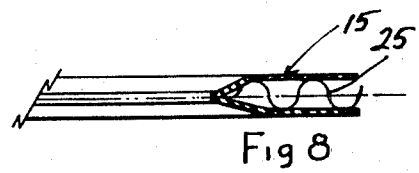
Figure 9:
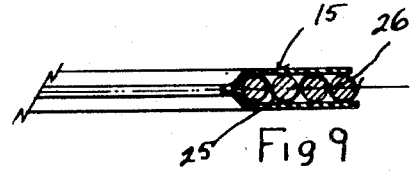

For flat, parallel metal flanges Figure 8 shows the use of plain corrugated metal filler 25. These fillers may be of any desired material such as soft steel, copper, aluminum, stainless or Monel. Figure 9 shows in section a corrugated metal filler 25 provided with asbestos 26 in the depressions and covered with a "Teflon" jacket 15.

Figure 10:
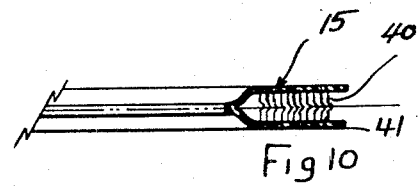

Figure 10 illustrates in cross-section an inner gasket made of spirally wound steel ribbon 40 having asbestos tape 41 interposed between the steel ribbon convolutions. This gasket assembly is highly suitable for sealing standard metal flanged pipes or other units having flange portions to be sealed.

Although I prefer to use "Teflon" for the jacket material, other plastic materials such as polyethylene, polyamides, and polymerized chloroprene (Duprene) can be used which will have the requisite plastic and sealing characteristics and at the same time protect the gasket against the deleterious action of any liquids or gases present in any system in which it is used.

The "Teflon" jacket is preferably provided as a continuous preformed circular sheath of suitable dimensions, preferably U-shaped in cross-section as shown in Figures 2 and 3 to snugly embrace the inner compressible gasket element. In making the gasket assembly, the inner compressible gasket element having any suitable construction, as previously explained, is positioned within the jacket so that a continuous jacket surface is presented at the inner periphery of the inner gasket element inasmuch as this surface is exposed to the corrosive effects of gases or fluids in the system in which the gasket assembly is used. Instead of using preformed jacket, I may wind a tape of "Teflon" or other plastic material about the inner periphery and top and bottom faces of the gasket by folding the tape into U-shaped form while applying the tape to the inner periphery of the gasket and then overlapping the ends of the tape. The ends of the tape may be adhered by a suitable adhesive in order to retain the tape in position. The ends of the tape may also be overlapped in stepped relation after more than one convolution of the tape is used, in order to avoid undue thickness at the overlapped portions. It is ordinarily not necessary to utilize any adhesive for attaching the plastic jacket to the inner gasket element because the parts are so dimensioned as to snugly fit within each other. However, in the case where the free ends of the jacket are folded inwardly in the manner illustrated in Figures 3 and 4, it may sometimes be desirable to provide adhesive at the folded back and interposed portions of the jacket in order to assure retention thereof within the gasket element.

The specific gasket constructions herein described are given as illustrative embodiments of my invention which are intended to be covered, including any other modifications and improvements thereof, within the scope of the appended claims.

I claim:

1. A sealing member construction comprising an inner resilient compressible sealing member and an outer continuous impervious jacket of chemically inert plastic material resistant to acids and solvents enclosing said inner member, said jacket being free of radial seams or joints, having continuous smooth unbroken exposed annular faces and being unadhered to the said inner gasket.

2. A gasket construction comprising an inner resilient compressible sealing gasket and an outer jacket of polymerized polytetrafluoroethylene enclosing said inner gasket, said jacket being free of radial seams or joints, having continuous smooth unbroken exposed annular faces and being unadhered to the said inner gasket.

3. A gasket construction comprising an inner resilient compressible sealing gasket of compressed asbestos and an outer jacket of plastic material of polymerized polytetrafluoroethylene enclosing said inner ring, said jacket being free of radial seams or joints, having continuous smooth unbroken exposed annular faces and being unadhered to the said inner gasket.

4. A gasket construction comprising an inner resilient compressible sealing gasket of corrugated sheet metal and an outer jacket of plastic material of polymerized polytetrafluoroethylene enclosing said inner ring, said jacket being free of radial seams or joints, having continuous smooth unbroken exposed annular faces and being unadhered to the said inner gasket.

5. A gasket construction comprising an inner resilient compressible sealing gasket of spirally wound steel ribbon and asbestos tape and an outer continuous impervious jacket of acid and solvent-proof plastic material of polymerized polytetrafluoroethylene enclosing said inner ring, said jacket being free of radial seams or joints, having continuous smooth unbroken exposed annular faces and being unadhered to the said inner gasket.

6. A gasket construction comprising an inner resilient compressible sealing gasket formed of a core of compressed asbestos having an outer layer of woven asbestos surrounding said core, and an outer jacket of plastic material of polymerized polytetrafluoroethylene enclosing said gasket, said jacket being free of radial seams or joints, having continuous smooth unbroken exposed annular faces and being unadhered to the said inner gasket.

7. A gasket construction comprising an inner resilient compressible sealing gasket formed of a core of compressed asbestos having an outer layer of woven asbestos surrounding said core, and an outer jacket of plastic material of polymerized polytetrafluoroethylene enclosing said gasket, the free edges of said plastic jacket being folded back and interposed between said core and outer layer of woven asbestos, said jacket being free of radial seams or joints, having continuous smooth unbroken exposed annular faces and being unadhered to the said inner gasket.

CHARLES M. HOBSON, Jr.

REFERENCES CITED

The following references are of record in the file of this patent:

UNITED STATES PATENTS

| Number | Name | Date |
|---|---|---|
| 1,648,391 | Farrington | Nov. 8, 1927 |
| 1,856,051 | Fryling | Apr. 26, 1932 |
| 1,869,932 | Brown | Aug. 2, 1932 |
| 2,074,388 | Gordon | Mar. 23, 1937 |
| 2,192,739 | Goetze | Mar. 5, 1940 |
| 2,393,967 | Brubaker | Feb. 5, 1946 |
| 2,459,720 | Poltorak | Jan. 18, 1949 |

FOREIGN PATENTS

| Number | Country | Date |
|---|---|---|
| 343,387 | Italy | of 1936 |